US011750832B2

(12) United States Patent
Su et al.

(10) Patent No.: US 11,750,832 B2
(45) Date of Patent: Sep. 5, 2023

(54) METHOD AND APPARATUS FOR VIDEO CODING

(71) Applicant: MEDIATEK INC., Hsinchu (TW)

(72) Inventors: Yu-Chi Su, Hsinchu (TW); Chen-Yen Lai, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 292 days.

(21) Appl. No.: 16/168,724

(22) Filed: Oct. 23, 2018

(65) Prior Publication Data
US 2019/0132606 A1 May 2, 2019

Related U.S. Application Data

(60) Provisional application No. 62/580,505, filed on Nov. 2, 2017, provisional application No. 62/621,131, filed on Jan. 24, 2018.

(51) Int. Cl.
*H04N 19/119* (2014.01)
*H04N 19/513* (2014.01)
(Continued)

(52) U.S. Cl.
CPC ......... *H04N 19/513* (2014.11); *H04N 19/119* (2014.11); *H04N 19/176* (2014.11);
(Continued)

(58) Field of Classification Search
CPC .. H04N 19/513; H04N 19/176; H04N 19/119; H04N 19/44
See application file for complete search history.

(56) References Cited

U.S. PATENT DOCUMENTS

2006/0245497 A1  11/2006 Tourapis et al.
2009/0196517 A1*  8/2009 Divorra Escoda ..... H04N 19/61
                                                  382/240
(Continued)

FOREIGN PATENT DOCUMENTS

CN    101325710 A    12/2008
CN    106604035 A     4/2017

OTHER PUBLICATIONS

Xu Chen et al., Decoder-Side Motion Vector Refinement Based on Bilateral Template Matching$^{th}$ Joint Video Exploration Team (JVET) of ITU-T SG 16 WP 3 and ISO/IEC JTC 1/SC 29/WG 11, 4th Meeting: Chengdu, CN, Oct. 15-21, 2016, p. 1-4.

(Continued)

*Primary Examiner* — Shawn S An
(74) *Attorney, Agent, or Firm* — Oblon, McClelland, Maier & Neustadt, L.L.P.

(57) ABSTRACT

Aspects of the disclosure provide a method and an apparatus for video coding. A processing circuitry determines a process unit size for a decoder-side motion vector refinement (DMVR). Then, the processing circuitry enables an application of the DMVR on a current block when a size of the current block is smaller than or equal to the process unit size; and disables the application of the DMVR on the current block when the size of the current block is larger than the process unit size. In an example, the application of the DMVR refines the motion vectors with or without a template block.

10 Claims, 8 Drawing Sheets

(51) Int. Cl.
  *H04N 19/176* (2014.01)
  *H04N 19/44* (2014.01)
  *H04N 19/577* (2014.01)
  *H04N 19/543* (2014.01)
  *H04N 19/53* (2014.01)
  *H04N 19/523* (2014.01)
  *H04N 19/557* (2014.01)

(52) U.S. Cl.
  CPC ........... *H04N 19/44* (2014.11); *H04N 19/523* (2014.11); *H04N 19/53* (2014.11); *H04N 19/543* (2014.11); *H04N 19/557* (2014.11); *H04N 19/577* (2014.11)

(56) References Cited

U.S. PATENT DOCUMENTS

| | | | | |
|---|---|---|---|---|
| 2011/0176611 | A1* | 7/2011 | Huang | H04N 19/46 |
| | | | | 375/E7.123 |
| 2011/0310976 | A1* | 12/2011 | Wang | H04N 19/176 |
| | | | | 375/240.24 |
| 2014/0105275 | A1 | 4/2014 | Wang et al. | |
| 2016/0345011 | A1 | 11/2016 | Naing et al. | |
| 2017/0134750 | A1* | 5/2017 | Ikai | H04N 19/159 |
| 2017/0195671 | A1* | 7/2017 | Choi | H04N 19/61 |
| 2018/0241998 | A1* | 8/2018 | Chen | H04N 19/51 |
| 2018/0352226 | A1* | 12/2018 | An | H04N 19/12 |
| 2018/0359483 | A1* | 12/2018 | Chen | H04N 19/52 |
| 2019/0075328 | A1* | 3/2019 | Huang | H04N 19/176 |
| 2019/0141338 | A1* | 5/2019 | Bultje | H04N 19/119 |
| 2019/0222848 | A1* | 7/2019 | Chen | H04N 19/176 |
| 2020/0029087 | A1* | 1/2020 | Lim | H04N 19/577 |

OTHER PUBLICATIONS

Taiwanese Office Action dated Aug. 16, 2019 in Patent Application No. 107138889.

International Search Report and Written Opinion dated Feb. 1, 2019 in PCT/CN2018/112650, 9 pages.

Kamp, S., et al., "Decoder-Side Motion Vector Derivation for Block-Based Video Coding", IEEE Transactions on Circuits and Systems for Video Technology, vol. 22 No. 12, Dec. 2012, pp. 1732-1745.

Combined Taiwanese Office Action and Search Report dated May 31, 2019 in corresponding Taiwanese Patent Application No. 107138889 (with English Translation of Category of Cited Documents), 7 pages.

Chen, J et al. "Algorithm Description of Joint Exploration Test Model 7 (JEM7)," Joint Video Exploration Team (JVET) of ITU-T SG 16 WP 3 and ISO/IEC JTC 1/SC 28/WG 11, 7$^{th}$ Meeting: Torino, IT, Jul. 13-21, 2017.

Supplementary European Search Report dated Apr. 21, 2021 in EP Application No. 18873888.4.

\* cited by examiner

METHOD AND APPARATUS FOR VIDEO CODING

INCORPORATION BY REFERENCE

This present disclosure claims the benefit of U.S. Provisional Application No. 62/580,505, "DMVR Improvement" filed on Nov. 2, 2017, and U.S. Provisional Application No. 62/621,131, "DMVR Complexity Reduction" filed on Jan. 24, 2018. The entire disclosures of the prior applications are incorporated by reference herein in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding standards, such as high efficiency video coding (HEVC) standard, and the like, use video compression technologies to improve coding efficiency and improve video quality. In an example, redundant portions in video frames are replaced with a short description instead of the original pixels to improve coding efficiency. When the redundant portions are within a single frame, intra-frame prediction technology can be used for encoding/decoding. When the redundant portions are in subsequent frames, inter-frame prediction technology can be used for encoding/decoding.

SUMMARY

Aspects of the disclosure provide a method and an apparatus for video coding. The apparatus includes processing circuitry for video coding. The processing circuitry receives a first motion vector and a second motion vector to start a motion vector refinement of the first motion vector and the second motion vector for a prediction block in a present frame of a video. The first motion vector is indicative of a first reference block in a first reference frame, and the second motion vector is indicative of a second reference block in a second reference frame. The present frame is between the first reference frame and the second reference frame in the video. The processing circuitry then calculates a template block based on a combination of the first reference block and the second reference block. Further, in an example, the processing circuitry refines the first motion vector with reference to the template block to obtain a first refined motion vector that is indicative of a first relocated reference block in the first reference frame. Then, the processing circuitry calculates a performance measure of the motion vector refinement based on the refinement of the first motion vector, and selectively terminates the motion vector refinement of the second motion vector based on the performance measure.

In some embodiments, the processing circuitry receives the first motion vector and the second motion vector that are associated with a neighboring block to the prediction block. The prediction block inherits the first motion vector and the second motion vector from the neighboring block.

In some embodiments, the processing circuitry calculates a similarity of the first motion vector and the first refined motion vector. In an embodiment, the processing circuitry terminates the motion vector refinement of the second motion vector when the first motion vector and the first refined motion vector are identical. In another embodiment, the processing circuitry terminates the motion vector refinement of the second motion vector when the similarity satisfies a similarity requirement. In some embodiments, the processing circuitry receives a signal that is indicative of at least one of a parameter, a mode and a threshold that is used to determine the similarity requirement. The signal can be at one of a slice level, a picture level or a sequence level.

In some embodiments, the processing circuitry terminates the motion vector refinement of the second motion vector when the similarity satisfies a predefined similarity requirement.

To calculate the performance measure of the motion vector refinement based on the refinement of the first motion vector, in some embodiments, the processing circuitry calculates a distortion between the template block and the first relocated reference block. In an embodiment, the processing circuitry terminates the motion vector refinement when the distortion is indicative of no distortion between the template block and the first relocated reference block. In another embodiment, the processing circuitry terminates the motion vector refinement when the distortion is smaller than a threshold.

According to an aspect of the disclosure, the apparatus includes a memory circuit that buffers the first motion vector before the refinement of the first motion vector. The processing circuitry retrieves the first motion vector from the memory circuit when the motion vector refinement of the second motion vector is terminated, and calculates the prediction block based on the first motion vector and the second motion vector.

According to some aspects of the disclosure, the apparatus can include processing circuitry that determines a process unit size for a decoder-side motion vector refinement (DMVR). Then, the processing circuitry enables an application of the DMVR on a current block when a size of the current block is smaller than or equal to the process unit size; and disables the application of the DMVR on the current block when the size of the current block is larger than the process unit size. The processing circuitry performs motion refinement for the first motion vector or the second motion vector with or without a template block that is calculated based on a combination of the first reference block and the second reference block.

In some embodiments, when the size of the current block is larger than the process unit size, the processing circuitry partitions the current block into a plurality of sub-current blocks having a size equal to or smaller than the process unit size, and applies the DMVR on each of the sub-current blocks independently. In some examples, the process unit size is predefined or signaled at a sequence level, picture level or slice level of a bitstream. In some examples, the process unit size is dependent on video resolution or standard profile.

In an embodiment, the first motion vector is buffered in a memory circuit before the refinement of the first motion vector. The processing circuitry retrieves the first motion vector from the memory circuit when the motion vector refinement of the second motion vector is terminated; and calculates the prediction block based on the first motion vector and the second motion vector.

Aspects of the disclosure also provide a non-transitory computer-readable medium storing instructions which when executed by a computer cause the computer to perform the method of video coding.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
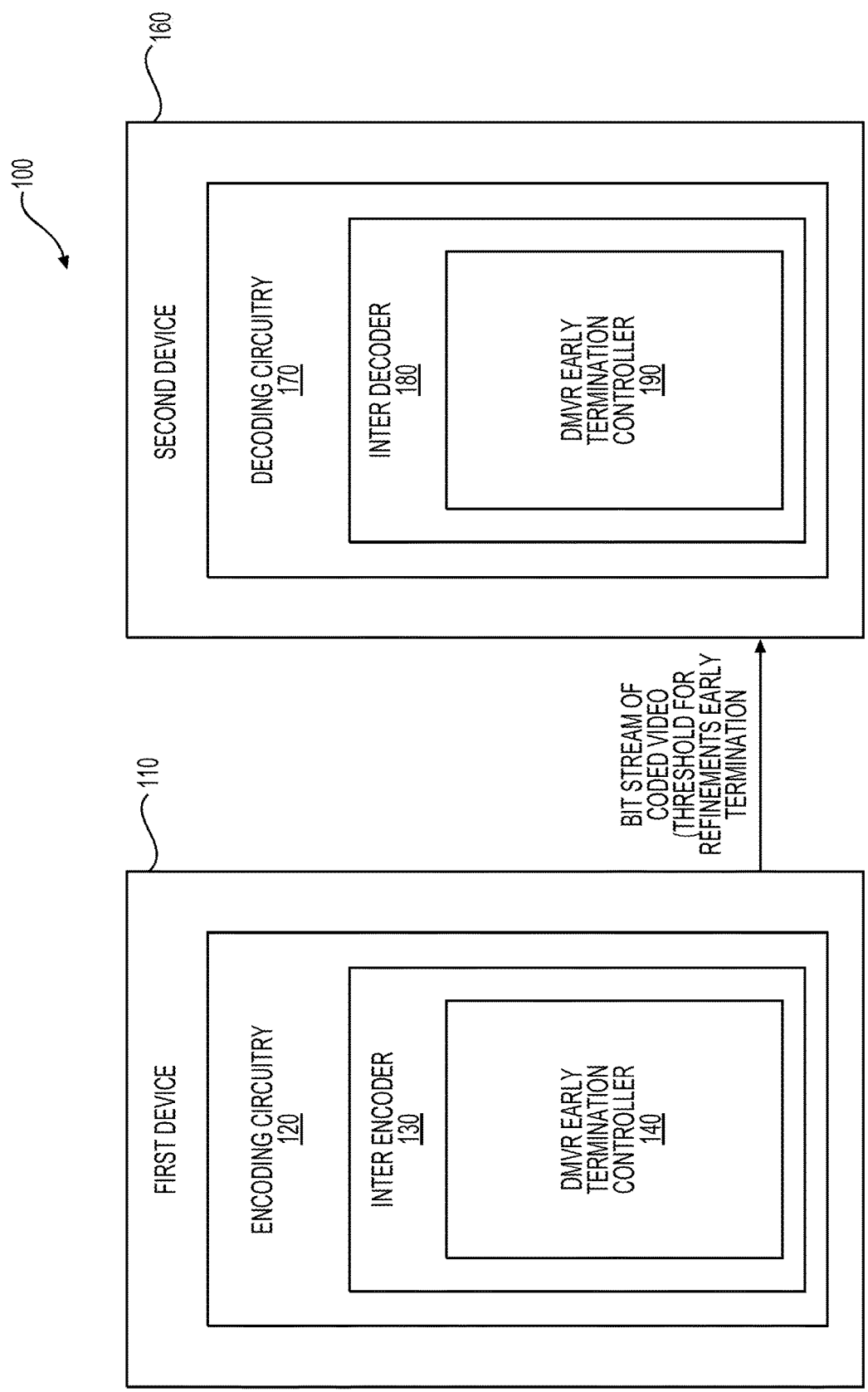
FIG. 1 shows a diagram of an electronic system 100 according to an embodiment of the disclosure.

Aspects of the disclosure provide techniques for early termination or disabling of decoder-side motion vector refinement (DMVR). DMVR is a technique used in video coding (encoding/decoding) to obtain refined motion vectors without transmission of additional information, for example syntax elements. However, DMVR can increase the amount of computation workload and increase processing time. According to an aspect of the disclosure, DMVR is terminated early (e.g., skipped or partially performed), for example when the video quality improvement by DMVR does not justify the increase of processing time.

In various embodiments, DMVR is used in the merge mode of inter-frame prediction. Generally, a video is captured as a plurality of frames (video frames) in a temporal sequence, and inter-frame prediction makes uses of temporal correlation between the frames. In an example, a specific frame under encoding/decoding, which is referred to as a present frame, is partitioned into blocks. When a block in the present frame is similar to a reference block in a reference frame in the video, the block in the present frame can be coded by a vector that is referred to as a motion vector. The motion vector points to the reference block in the reference frame.

In some embodiments, a bi-prediction technique can be used in the inter-frame prediction. According to the bi-prediction technique, two reference frames, such as a first reference frame that is prior to the present frame in the video, and a second reference frame that is after the present frame in the video are used. A block in the present frame can be coded by a first motion vector that points to a first reference block in the first reference frame, and a second motion vector that points to a second reference block in the second reference frame. The block can be predicted by a combination of the first reference block and the second reference block.

Further, a merge mode technique is used in the inter-frame prediction to improve coding efficiency. In the merge mode, a block in the present frame can inherit motion vectors of a neighboring block (e.g., that shares a boundary with the block, is disposed in a larger partition region with the block) in the present frame. To improve video quality, in some examples, DMVR is applied on the motion vectors that are associated with the neighboring block to determine refined motion vectors for the block.

In an example, in the merge mode, a block inherits a first motion vector $[\Delta x_0, \Delta y_0]$ and a second motion vector $[\Delta x_1, \Delta y_1]$ that are associated with a neighboring block. The first motion vector points to a first reference block in a first reference frame, and the second motion vector points to a second reference block in a second reference frame. For DMVR, a template block is calculated based on a combination (e.g., averaging at a pixel level, weighted averaging at the pixel level) of the first reference block and the second reference block. Further, based on the template block, the first motion vector and the second motion vector are respectively refined, for example first by ±1 pixel refinement and then by ±0.5 pixel refinement.

For example, to refine the first motion vector, the template block is compared with blocks in the first reference frame that are respectively pointed by the first motion vector and eight candidate motion vectors for the ±1 pixel refinement, such as nine motion vectors $[\Delta x_0, \Delta y_0]$, $[\Delta x_0 \pm 1, \Delta y_0 \pm 1]$, $[\Delta x_0 \pm 1, \Delta y_0]$, and $[\Delta x_0, \Delta y_0 \pm 1]$, to determine a first temporary motion vector $[\Delta x_{0-tmp}, \Delta y_{0-tmp}]$ as a result of the ±1 pixel refinement. The first temporary motion vector is selected from the nine motion vectors for the ±1 pixel refinement, and points to a first temporary reference block in the first reference frame with a minimum distortion (maximum similarity) to the template block. In the example, the distortion or the similarity is measured by a sum of absolute differences (SAD) at a pixel level. In another example, the distortion or the similarity is measured by a sum of squared differences (SSD).

Further, in an embodiment, the template block is compared with blocks in the first reference frame that are respectively pointed by the first temporary motion vector and eight candidate motion vectors for the ±0.5 pixel refinement, such as nine motion vectors $[\Delta x_{0-tmp}, \Delta y_{0-tmp}]$, $[\Delta x_{0-tmp} \pm 0.5, \Delta y_{0-tmp} \pm 0.5]$, $[\Delta x_{0-tmp} \pm 0.5, \Delta y_{0-tmp}]$, and $[\Delta x_{0-tmp}, \Delta y_{0-tmp} \pm 0.5]$ to determine a first refined motion vector as a result of the ±0.5 pixel refinement. The first refined motion vector is selected from the nine motion vectors for the ±0.5 pixel refinement and points to a first relocated reference block in the first reference frame with a minimum distortion (maximum similarity) to the template block. In the example, the distortion or the similarity is measured by SAD or SSD.

Similarly, based on the template block, the second motion vector is refined, for example first by ±1 pixel refinement and then by ±0.5 pixel refinement. Then, the block in the present frame can be inter-frame predicted using the first refined motion vector and the second refined motion vector according to the bi-prediction technique.

In the foregoing examples, DMVR performs motion vector refinement for the first motion vector or the second motion vector with a template block. However, in other examples, DMVR performs motion vector refinement for the first motion vector or the second motion vector without the template block. For example, the motion refinement process can be performed based on the distortion between the first relocated reference block indicated by the first refined motion vector and the second relocated reference block indicated by the second refined motion vector.

The DMVR includes a relatively large amount of computation, such as a relatively large amount of computation for SAD or SSD. According the disclosure, when DMVR is terminated early (e.g., skipped or partially performed), computation workload can be reduced and processing time can be reduced.

FIG. 1 shows a diagram of an electronic system 100 according to an embodiment of the disclosure. The electronic system 100 includes a plurality of electronic devices that use various coding (encoding/decoding) techniques, such as inter prediction coding techniques, intra prediction coding techniques, and the like, to efficiently deliver video among the plurality of electronic devices. In the FIG. 1 example, the electronic system 100 includes a first device 110 and a second device 160, and video is coded and the coded video is transmitted in a bitstream from the first device 110 to the second device 160.

According to an aspect of the disclosure, to improve coding efficiency and improve video quality, DMVR is applied in the merge mode for inter-frame bi-prediction. Further, DMVR is selectively terminated early (e.g., fully skipped or partially performed), for example, when the video quality improvement cannot justify the increase of computation. Thus, excess computation workload is reduced and processing delay can be reduced.

The plurality of electronic devices in the electronic system 100 can be any suitable devices. In an example, the first device 110 is multi-media capture device, such as a video recorder, a camera, a smart phone, a tablet computer, a laptop computer, a desktop computer, and the like configured to generate video frames and encode the video frames into coded video; and the second device 160 is a multi-media play device, such as a television, a projector, a smart phone, a tablet computer, a laptop computer, a desktop computer and the like configured to decode the coded video to construct decoded video frames and display the decoded video frames.

In another example, the first device 110 is coupled to a multi-media capture device (not shown) that generates video frames, and the first device 110 receives the video frames from the multi-media capture device and encodes the video frames. In another example, the second device 160 is coupled to a multi-media play device (not shown), and the second device 160 decodes the coded video to construct the decoded video frames and provides the decoded video frames to the multi-media play device for play.

In the FIG. 1 example, the first device 110 transmits the coded video in a bitstream to the second device 160 via any suitable communication channel according to one or more communication standards, such as a cable, a local area network (LAN), a wireless LAN (WLAN), a cellular network, an optical network, Internet, or any combination of the above. In an example, the bitstream is carried in electrical signals and transmitted via a cable. In another example, the bitstream is carried in packets, and the packets are transmitted by electrical signals in an LAN. In another example, the packets can be carried by radio frequency signals, for example, in a WLAN, or a cellular network.

According to an aspect of the disclosure, the first device 110 includes processing circuitry for an encoder 120. The encoder 120 is configured to encode video according to a video coding standard, such as a high efficiency video coding (HEVC) standard, and generate the bitstream of coded video. The bitstream is transmitted by the first device 110 and/or other devices (not shown) in any suitable format. The second device 160 includes processing circuitry for a decoder 170. The decoder 170 is configured to receive a bitstream of coded video, and decode the bitstream to generate the decoded video frames according to a video coding standard, such as the HEVC standard.

Further, the encoder 120 uses DMVR in the merge mode for inter-frame bi-prediction during encoding and the decoder 170 uses DMVR in the merge mode for inter-frame bi-prediction during decoding. The DMVR can be selectively terminated early, or can be disabled for the blocks with size larger than a threshold. For example, the encoder 120 includes an inter encoder 130 configured to apply DMVR in the merge mode for inter-frame bi-prediction. The inter encoder 130 includes a DMVR early termination controller 140 configured to selectively terminate the DMVR before the DMVR is fully performed, or configured to disable the DMVR for the blocks with size larger than a threshold.

Similarly, the decoder 170 includes an inter decoder 180 configured to apply DMVR in the merge mode for inter-frame bi-prediction. The inter decoder 180 includes a DMVR early termination controller 190 configured to selectively terminate the DMVR before the DMVR is fully performed, or configured to disable the DMVR for the blocks with size larger than a threshold.

It is noted that the encoder 120 and the decoder 170 can be implemented using any suitable technique. In an embodiment, the encoder 120 and the decoder 170 is implemented using integrated circuit. In another example, the encoder 120 and the decoder 170 are implemented using a processor that executes software instructions.

It is also noted that the first device 110 and the second device 160 can include other suitable components. For example, the first device 110 can include a decoder (not shown), and the second device 160 can include an encoder (not shown).

The DMVR early termination controller 140 and the DMVR early termination controller 190 can terminate or disable the DMVR based on various conditions. Some embodiments are described with reference to FIG. 2.

Figure 2:
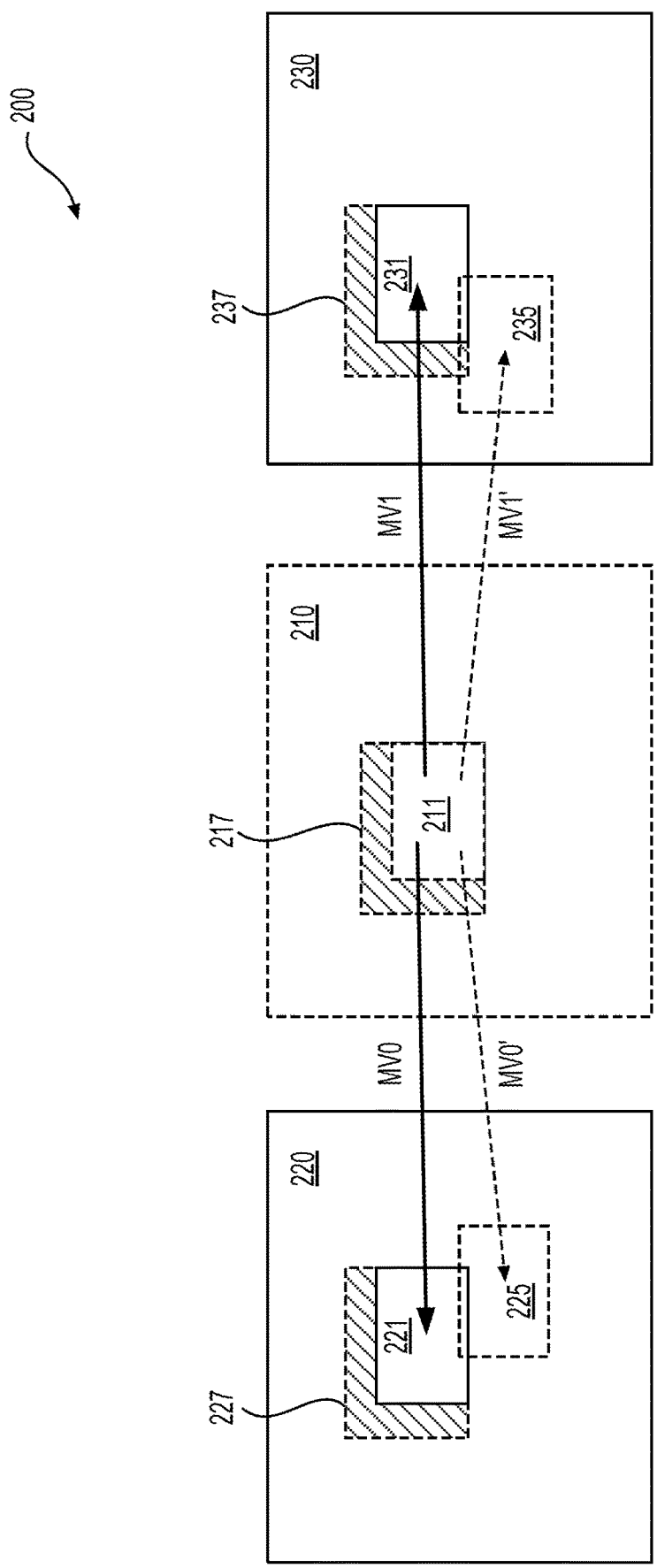
FIG. 2 shows a plot 200 for motion vector refinement according to an embodiment of the disclosure.

FIG. 2 shows a plot 200 of an inter-frame bi-prediction example according to an embodiment of the disclosure. The plot 200 shows a present frame 210 (a current frame) for encoding/decoding, a first reference frame 220 that is prior to the present frame 210 in a video, and a second reference frame 230 that is after the present frame 210 in the video. It is noted that the number of frames between the first reference frame 220 and the present frame 210 can be different from the number of frames between the present frame 210 and the second reference frame 230.

The present frame 210 includes a block 211 that is coded (encoded/decoded) in the merge mode by an inter-frame bi-prediction. In an embodiment, prediction is performed in the unit of blocks. For example, according to HEVC standard, a picture frame in a sequence of video frames is partitioned into coding tree units (CTU) for compression, the CTUs in a picture frame have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type, an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like. In some embodiments, the block 211 is a prediction block that is predicted by an inter-frame bi-prediction in the merge mode.

For example, the block 211 inherits a first motion vector MV0 and a second motion vector MV1 from a neighboring block (not shown) in the present frame 210. The first motion vector MV0 points to a first reference block 221 in the first reference frame 220, and the second motion vector MV1 points to a second reference block 231 in the second reference frame 230. Based on the first motion vector MV0 and the second motion vector MV1, DMVR can be performed to determine a first refined motion vector MV0' and a second refined motion vector MV1'. The first refined motion vector MV0' points to a first relocated reference block 225, and the second refined motion vector MV1' points to a second relocated reference block 235.

In this example, during DMVR, a template block is calculated. In an example, the template block is calculated based on a combination (e.g., averaging at a pixel level, weighted averaging at the pixel level) of the first reference block 221 and the second reference block 231. Further, based on the template block, the first motion vector MV0 and the second motion vector MV1 are respectively refined. In an example, the first motion vector MV0 and the second motion vector MV1 are refined in serial. For example, the first motion vector MO is refined, and then the second motion vector MV1 is refined.

It is noted that DMVR early termination can be performed at various steps during the DMVR. In an example, the DMVR is skipped and thus is terminated before the template block is calculated, thus none of the operations for the DMVR is performed. In another example, the DMVR is terminated after the template block is calculated and before the refinement of the first motion vector and the second motion vector, thus the refinement of the first motion vector and the second motion vector is not performed. In another example, the DMVR is terminated after one of the first and second motion vectors is refined, and before the other of the first and second motion vectors is refined, thus the refinement for one of the first and second motion vectors is not performed.

When the DMVR is fully performed, in an example, the block 211 is predicted based on the first refined motion vector MV0' and the second refined motion vector MV1' according to a bi-prediction technique. For example, the block 211 is predicted as a combination (e.g., averaging, weighted averaging) of the first relocated reference block 225 and the second relocated reference block 235.

In an embodiment, when the DMVR is skipped, the block 211 is predicted based on the first motion vector MV0 and the second motion vector MV1 that are inherited from the neighboring block. For example, the block 211 is predicted as a combination (e.g., averaging, weighted averaging) of the first reference block 221 and the second reference block 231.

In another embodiment, the DMVR is partially performed that one of the first and second motion vectors is refined and the refinement of the other of the first and second motion vectors is skipped. For example, the partial DMVR is performed to determine the first refined motion vector MV0'. In an example, the block 211 is predicted as a combination (e.g., averaging, weighted averaging) of the first reference block 221 and the second relocated reference block 235. In another example, the block 211 is predicted as a combination (e.g., averaging, weighted averaging) of the first relocated reference block 225 and the second reference block 231.

In one embodiment, after the first refined motion vector MV0' is determined and before the second motion vector MV1 is refined, the DMVR early termination controller 140 (or the DMVR early termination controller 190) compares the first refined motion vector MV0' with the first motion vector MV0. In an example, when the first refined motion vector MV0' is exactly the same as the first motion vector MV0, the DMVR early termination controller 140 (or the DMVR early termination controller 190) terminates the DMVR. Thus, the refinement of the second motion vector, for example, the motion estimation to search for the best matching block in second reference frame 230 with the template block for the second motion vector MV1 refinement, is skipped.

In another example, when the first refined motion vector MV0' is very similar to but not exactly the same as the first motion vector MV0, the DMVR early termination controller 140 (or the DMVR early termination controller 190) terminates the DMVR. Thus, the refinement of the second motion vector, for example, the motion estimation to search for the best matching block in second reference frame 230 with the template block for the second motion vector MV1 refinement, is skipped. In an example, the first refined motion vector MV0' and the second motion vector MV1 are used in the bi-prediction to predict the block 211. In another example, the first motion vector MV0 is suitably buffered in a memory circuit. Then, when the DMVR is terminated early, the buffered first motion vector MV0 is retrieved from the memory circuit, and the first motion vector MV0 and the second motion vector MV1 are used in the bi-prediction to predict the block 211.

In some examples, the similarity of the first refined motion vector MV0' and the first motion vector MV0 are determined by explicitly signaling. In an example, the DMVR early termination controller 140 uses certain parameters, modes or thresholds to determine the similarity at the first device 110. Then, the parameters, modes or the thresholds are suitably included in the coded video, for example, at a slice level, a picture level or a sequence level, by the first device 110 to signal the second device 160. The second device 160 determines the parameters, modes or the thresholds based on the signaling in the coded video. Then, the DMVR early termination controller 190 uses the determined parameters, modes or thresholds to determine the similarity of the first refined motion vector MV0' and the first motion vector MV0 at the second device 160.

In some examples, the similarity of the first refined motion vector MV0' and the first motion vector MV0 are determined by implicit selection, such as pre-defined thresholds. For example, a first threshold vth and a second threshold hth are predefined. When the absolute difference of the first motion vector MV0 and the first refined motion vector MV0' projected in vertical direction is smaller than the first threshold vth, and the absolute difference of the first motion vector MV0 and the first refined motion vector MV0' projected in horizontal direction is also smaller than the second threshold hth, then the first motion vector MV0 and the first refined motion vector MV0' are determined to be similar. In another example, when the absolute difference of the first motion vector MV0 and the first refined motion vector MV0' projected in vertical direction is smaller than the first threshold vth, the first motion vector MV0 and the first refined motion vector MV0' are determined to be similar. In another example, the absolute difference of the first motion vector MV0 and the first refined motion vector MV0' projected in horizontal direction is also smaller than the second threshold hth, the first motion vector MV0 and the first refined motion vector MV0' are determined to be similar.

In one embodiment, after the first refined motion vector MV0' is determined and before the second motion vector MV1 is refined, the DMVR early termination controller 140 (or the DMVR early termination controller 190) compares the first relocated reference block 225 with the template block. In an example, when the first relocated reference block 225 is the same as the template block, the DMVR early termination controller 140 (or the DMVR early termination controller 190) terminates the DMVR. In another example, the DMVR early termination controller 140 (or the DMVR early termination controller 190) calculates a distortion between the first relocated reference block 225 and the template block. For example, the distortion is calculated as a sum of absolute differences at the pixel level. When the distortion is smaller than a threshold, the DMVR early termination controller 140 (or the DMVR early termination controller 190) terminates the DMVR. In an example, the first refined motion vector MV0' and the second motion vector MV1 are used in bi-prediction to predict the block. In another example, the buffered first motion vector MV0 and the second motion vector MV1 are used in bi-prediction to predict the block 211.

In some embodiments, before the template block is calculated, the DMVR early termination controller 140 (or the DMVR early termination controller 190) calculates a distortion between the first reference block 221 and the second reference block 231. The distortion can be calculated of any suitable measures. For example, the distortion is calculated as a sum of absolute differences (SAD) of pixels. In another example, the distortion is calculated as a sum of squared differences (SSD) of pixels. In an embodiment, when the distortion is greater than a threshold, the DMVR early termination controller 140 (or the DMVR early termination controller 190) terminates the DMVR, the whole process of DMVR is skipped and none of the operations for DMVR is performed.

In an embodiment, before the template block is calculated, the DMVR early termination controller 140 (or the DMVR early termination controller 190) calculates a distortion between a first inverse L-shape region 227 of the first reference block 221 and a second inverse L-shape region 237 of the second reference block 231. The first inverse L-shape region 227 includes any suitable rows extended from the top boundary of the first reference block 221 and any suitable columns extended from the left boundary of the first reference block 221. Similarly, the second inverse L-shape region 237 includes any suitable rows extended from the top boundary of the second reference block 231 and any suitable columns extended from the left boundary of the second reference block 231. The distortion can be calculated as SAD, SSD, or other suitable measures. When the distortion is greater than a threshold, the DMVR early termination controller 140 (or the DMVR early termination controller 190) terminates the DMVR, the whole process of DMVR is skipped and none of the operations for DMVR is performed.

In an embodiment, before the template block is calculated, the DMVR early termination controller 140 (or the DMVR early termination controller 190) calculates a distortion between a present inverse L-shape region 217 of the block 211 and one of the first inverse L-shape region 227 and the second inverse L-shape region 237. The present inverse L-shape region 217 includes any suitable rows extended from the top boundary of the block 211 and any suitable columns extended from the left boundary of the block 211. The distortion can be calculated as SAD, SSD, or other suitable measures. When the distortion is greater than a threshold, the DMVR early termination controller 140 (or the DMVR early termination controller 190) terminates the DMVR, the whole process of DMVR is skipped and none of the operations for DMVR is performed.

In an embodiment, before the template block is calculated, the DMVR early termination controller 140 (or the DMVR early termination controller 190) calculates a difference of picture order count (POC) between the first reference frame 220 and the second reference frame 230. The POC is used to indicate an output order of a decoded frame. When the POC difference of the first reference frame 220 and the second reference frame 230 is larger than a threshold, the DMVR early termination controller 140 (or the DMVR early termination controller 190) terminates the DMVR, the whole process of DMVR is skipped and none of the operations for DMVR is performed.

In an embodiment, before the template block is calculated, the DMVR early termination controller 140 (or the DMVR early termination controller 190) calculates a difference of quantization parameter (QP) between the first reference frame 220 and the second reference frame 230. The QP is assigned to a frame to indicate video frame quality for the frame. When the QP difference of the first reference frame 220 and the second reference frame 230 is larger than a threshold, the DMVR early termination controller 140 (or the DMVR early termination controller 190) terminates the DMVR, the whole process of DMVR is skipped and none of the operations for DMVR is performed.

According to an aspect of the disclosure, the template block is calculated as a combination of the first reference block and the second reference block. In some embodiments, the template block is calculated as weighted averaging of the first reference block and the second reference block at each pixel.

In an embodiment, the weights are derived based on the POC of the first reference frame 220 (denoted as POC-1), the POC of the present frame 210 (denoted as POC-0) and the POC of the second reference frame 230 (denoted as POC-2). For example, the difference of POC-1 and POC-0 is denoted as pocDiff0, and the difference of POC-0 and POC-2 is denoted as pocDiff1. Two weight factors are calculated according to Eq. 1 and Eq. 2 to respectively weight the first reference block 221 and the second reference block 231.

$$W0 = \frac{pocDiff1}{pocDiff0 + pocDiff1} \qquad \text{Eq. 1}$$

$$W1 = \frac{pocDiff0}{pocDiff0 + pocDiff1} \qquad \text{Eq. 2}$$

For example, a pixel P in the template block has a corresponding pixel P0 in the first reference block 221 and a corresponding pixel P1 in the second reference block 231. A parameter of the pixel P ($M_P$) is calculated as weighted sum of the parameter of the corresponding pixel P0 ($M_{P0}$) in the first reference block 221 and the parameter of the corresponding pixel P1 ($M_{P1}$) in the second reference block 231, such as according to Eq. 3:

$$M_P = W0 \times M_{P0} + W1 \times M_{P1} \qquad \text{Eq. 3}$$

In another embodiment, the weights are derived based on the QP of the first reference frame 220 (denoted as QP-1), the QP of the present frame 210 (denoted as QP-0) and the QP of the second reference frame 230 (denoted as QP-2). For example, the difference of QP-1 and QP-0 is denoted as qpDiff0, and the difference of QP-0 and QP-2 is denoted as qpDiff1. Two weight factors are calculated according to Eq. 4 and Eq. 5 to respectively weight the first reference block 221 and the second reference block 231. Then, Eq. 3 can be updated to calculate the parameter of the pixel P ($M_P$) as weighted sum of the parameter of the corresponding pixel P0 ($M_{P0}$) in the first reference block 221 and the parameter of the corresponding pixel P1 ($M_{P1}$) in the second reference block 231.

$$W0 = \frac{qpDiff1}{qpDiff0 + qpDiff1} \qquad \text{Eq. 4}$$

$$W1 = \frac{qpDiff0}{qpDiff0 + qpDiff1} \qquad \text{Eq. 5}$$

According to an aspect of the disclosure, the DMVR early termination controller 140 (or the DMVR early termination controller 190) is configured to disable the DMVR based on a size of the current block (i.e., the block to be encoded or decoded at the moment). When the size of the current block is relatively large, the operations in the DMVR, such as SAD calculations, SSD calculations, and the like induce a large computation complexity in terms of data bit-depth. In an example, a size limit M×N (also referred to as the process unit size) is pre-defined, where M and N are positive integers. In an example, when the size of the current block is larger than the size limit M×N, the DMVR early termination controller 140 (or the DMVR early termination controller 190) disables the DMVR on the current block to reduce computation complexity.

In some embodiments, when the size of the current block is smaller than the size limit, DMVR can be applied to refine the motion vectors (i.e., DMVR is enable on the current block). When the size of the current block is larger than the size limit, the current block is partitioned into sub-blocks that are smaller than the size limit, and then DMVR is applied to the respective sub-blocks independently to reduce computation complexity. In this example, when the size of the current block is larger than the size limit, DMVR is not applied on the current block, but rather, applied on the sub-blocks partitioned from the current block.

Please note that the DMVR performed on the block with a size smaller than or equal to the size limit can be done with or without a template block that is calculated based on the combination of the first reference block and the second reference block.

In some embodiments, when the size of the current block is larger than the size limit, calculations used for the DMVR, such as SAD calculations, or SSD calculations and the like, can be done by using sub-sample technology to reduce the computation complexity. For example, when the row number of the current block is larger than M, a subset of the rows, such as odd rows, or even rows, and the like are selected to calculate SAD or SSD; and when the column number of the current block is larger than N, a subset of columns, such as odd columns, or even columns are selected to calculate SAD or SSD. In some examples, the possible values of M or N can be 16, 32, 64, 128, and so on. In an example, the values of M and N are pre-defined or signaled at sequence level, picture level or slice level in the coded video. In another example, the values of M and N dependent on video resolution or standard profile, and can be determined based on video resolution or standard profile.

Figure 3:
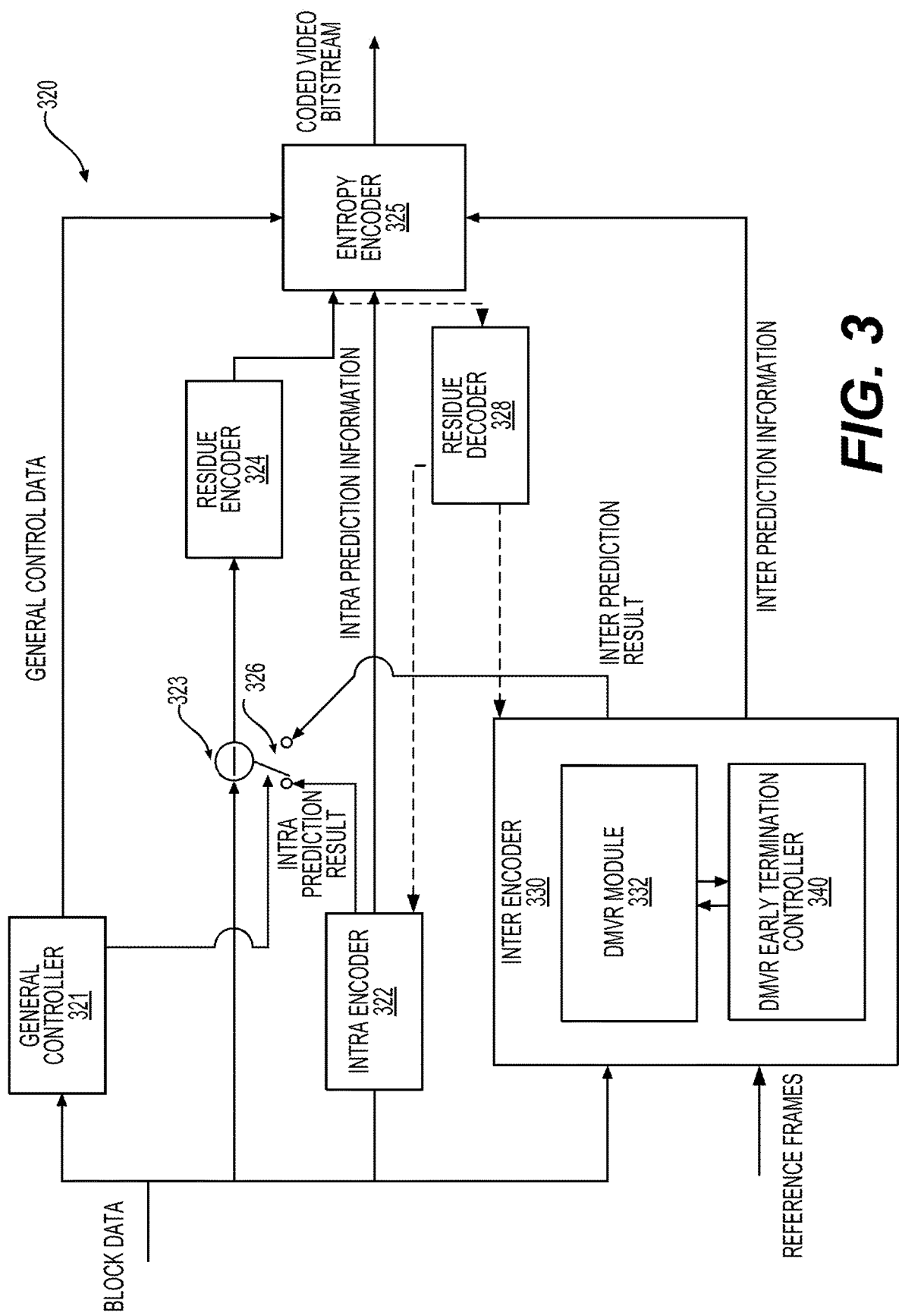
FIG. 3 shows a diagram of an encoder 320 according to an embodiment of the disclosure.

FIG. 3 shows a diagram of an encoder 320 according to an embodiment of the disclosure. The encoder 320 is configured to receive a processing block (e.g., a prediction block) of pixel values within a video frame in a sequence of video frames, and encode the processing block into bitstream of coded video. In an example, the encoder 320 is used in the place of the encoder 120 in the FIG. 1 example. The encoder 320 includes an inter encoder 330 configured to terminate DMVR before the DMVR is fully performed to reduce computation workload under various conditions.

In an HEVC example, the encoder 320 receives a matrix of pixel values for a processing block, such as a prediction block of 8×8 pixels, and the like. The encoder 320 determines whether the processing block has the intra prediction type or the inter prediction type. When the processing block has the intra prediction type, the encoder 320 uses intra prediction technique to encode the processing block into the bitstream; and when the processing block has inter prediction type, the encoder 320 uses inter prediction technique to encode the processing block into the bitstream. In an example, the encoder 320 includes other components, such as a prediction type determination module (not shown) to determine a prediction type of the processing blocks.

In the FIG. 3 example, the encoder 320 includes the inter encoder 330, an intra encoder 322, a residue calculator 323, a switch 326, a residue encoder 324, a general control module 321 and an entropy encoder 325 coupled together as shown in FIG. 3.

The inter encoder 330 is configured to receive the current block (e.g., a processing block), compare the block to one or more reference blocks in reference frames (e.g., blocks in previous frames and later frames), generate inter prediction information (e.g., description of redundant information according to inter encoding technique, motion vectors, merge mode information), and calculate inter prediction results (e.g., predicted block) based on the inter prediction information using any suitable technique. In some embodiments, the reference frames are decoded reference frames that are buffered in a memory (not shown).

The intra encoder 322 is configured to receive the current block (e.g., a processing block), compare the block to blocks in the same picture frame, generate intra prediction information (e.g., description of redundant information according to intra encoding technique, such as using one of 35 prediction modes), and calculate intra prediction results (e.g., predicted block) based on intra prediction information.

The general control module 321 is configured to determine general control data and control other components of the encoder 320 based on the general control data. In an example, the general control module 321 determines the prediction type of the block, and provides a control signal to the switch 326 based on the prediction type. For example, when the prediction type is the intra prediction type, the general control module 321 controls the switch 326 to select the intra prediction result for use by the residue calculator 323, and controls the entropy encoder 325 to select the intra prediction information and include the intra prediction information in the bitstream; and when the prediction type is the inter prediction type, the general control module 321 controls the switch 326 to select the inter prediction result for use by the residue calculator 323, and controls the entropy encoder 325 to select the inter prediction information and include the inter prediction information in the bitstream.

The residue calculator 323 is configured to calculate a difference (residue data) between the received block and prediction results selected from the intra encoder 322 or the inter encoder 330. The residue encoder 324 is configured to operate based on the residue data to encode the residue data to generate the transform coefficients. In an example, the residue data has relatively larger levels (energy) at high frequencies, and the residue encoder 324 is configured to convert the residue data in the frequency domain, and extract the high frequency portions for encoding to generate the transform coefficients. The transform coefficients are then subject to quantization process to obtain quantized transform coefficients. In various embodiments, the encoder 320 also includes a residue decoder 328. The residue decoder 328 is configured to perform inverse-transform, and generate the residue data. The residue data can be suitably used by the intra encoder 322 and the inter encoder 330. For example, the inter encoder 330 can generate decoded reference frames based on the residue data. The decoded reference frames can be buffered in a memory circuit (not shown).

The entropy encoder 325 is configured to format the bitstream to include the encoded block. The entropy encoder 325 is configured to include various information according to a suitable standard, such as HEVC standard. In an example, the entropy encoder 325 is configured to include the general control data, the selected prediction information (e.g., intra prediction information or inter prediction information), the residue information, and other suitable information in the bitstream.

The inter encoder 330 includes a DMVR module 332 and a DMVR early termination controller 340 coupled together as shown in FIG. 3. The DMVR module 332 is configured to perform operations of DMVR (such as the operations discussed with reference to FIG. 2 or the operations of refining motion vectors without the template block), and provide information to the DMVR early termination controller 340. The DMVR early termination controller 340 is configured to determine whether an early termination condition (such as the early termination conditions described with reference to FIG. 2) or a DMVR disabling condition is satisfied. When the early termination condition is satisfied, the DMVR early termination controller 340 provides control signals to the DMVR module 332 to terminate the DMVR before the DMVR is fully performed. Alternatively, when the DMVR disabling condition is satisfied, the DMVR early termination controller 340 provides control signals to the DMVR module 332 to disable the DMVR process.

Figure 4:
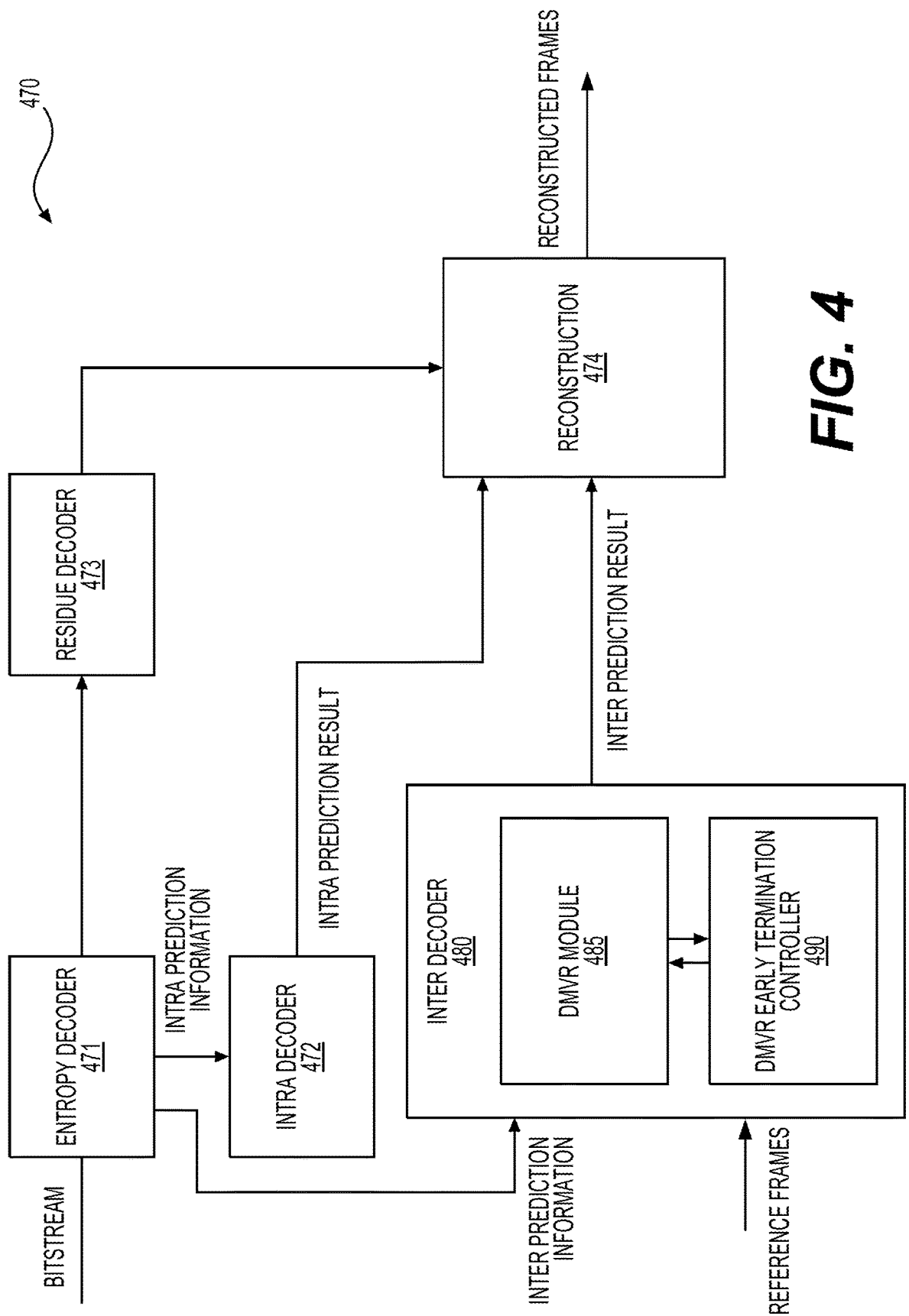
FIG. 4 shows a diagram of a decoder 470 according to an embodiment of the disclosure.

FIG. 4 shows a diagram of a decoder 470 according to an embodiment of the disclosure. The decoder 470 is configured to receive a bitstream of coded video, and decode the bitstream to generate decoded video frames. In an example, the decoder 470 is used in the place of the decoder 170 in the FIG. 1 example. The decoder 470 includes an inter decoder 480 configured to terminate DMVR before the DMVR is fully performed to reduce computation workload under various conditions.

In the FIG. 4 example, the decoder 470 includes an entropy decoder 471, the inter decoder 480, a residue decoder 473, the reconstruction module 474, and an intra decoder 472 coupled together as shown in FIG. 4.

The entropy decoder 471 is configured to determine entropy information, for example, the prediction information (intra prediction information or inter prediction information) that is an estimation of the redundant information of a processing block, the prediction type (inter prediction type or intra prediction type), the residual information, and the like. In an example, when the prediction type is the inter prediction type, the inter prediction information is provided to the inter decoder 480; and when the prediction type is the intra prediction type, the intra prediction information is provided to the intra decoder 472. The residual information is subject to inverse quantization and is provided to the residue decoder 473.

The inter decoder 480 is configured to receive the inter prediction information, and generate inter prediction results based on the inter prediction information and reference frames.

The intra decoder 472 is configured to receive the intra prediction information, and generate prediction results based on the intra prediction information.

The residue decoder 473 is configured to perform inverse quantization to extract de-quantized transform coefficients, and process the de-quantized transform coefficients to convert the residual from the frequency domain to the spatial domain.

The reconstruction module 474 is configured to combine the residual in the spatial domain and the prediction results to form decoded block, picture, and the video. It is noted that other suitable operations, such as a deblocking operation and the like, can be performed to improve the visual quality. In some embodiments, the reconstruction module 474 outputs reconstructed frames. The reconstructed frames can be buffered in a memory circuit (not shown) and then can be used as reference frames.

The inter decoder 480 includes a DMVR module 485 and a DMVR early termination controller 490. The DMVR module 485 is configured to perform operations of DMVR (such as the operations discussed with reference to FIG. 2 or the operations of refining motion vectors without the template block), and provide information to the DMVR early termination controller 490. The DMVR early termination controller 490 is configured to determine whether an early termination condition (such as the early termination conditions described with reference to FIG. 2) or a DMVR disabling condition is satisfied. When the early termination condition is satisfied, the DMVR early termination controller 490 provides control signals to the DMVR module 485 to terminate the DMVR before the DMVR is fully performed. Alternatively, when the DMVR disabling condition is satisfied, the DMVR early termination controller 490 provides control signals to the DMVR module 485 to disable the DMVR process.

Figure 5:
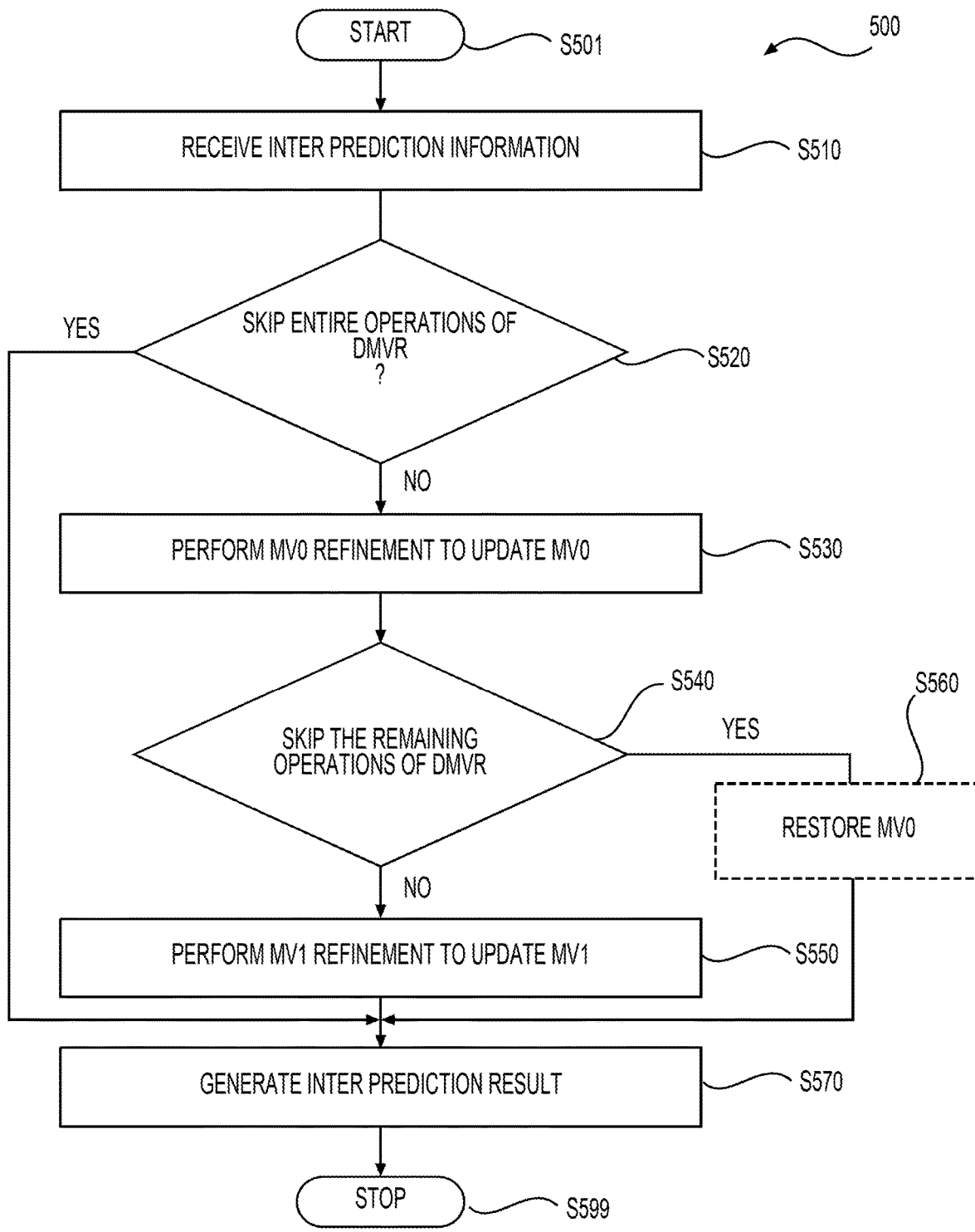
FIG. 5 shows a flow chart outlining a process 500 according to an embodiment of the disclosure.

FIG. 5 shows a flow chart outlining a process example 500 according to an embodiment of the disclosure. In an example, the process 500 is performed by a controller, such as the DMVR early termination controller 140, the DMVR early termination controller 190, the DMVR early termination controller 340, the DMVR early termination controller 490, and the like. The process starts at S501 and proceeds to S510.

At S510, inter prediction information is received. In an example, the inter prediction information is indicative of merge mode bi-prediction. Further, the inter prediction information is indicative of a neighboring block, a first reference frame, and a second reference frame. The controller can retrieve a first motion vector and a second motion vector associated with the neighboring block. Based on the first motion vector, the controller determines a first reference block in the first reference frame, and a second reference block in the second reference frame. Further, the controller can obtain, for example POCs of the first reference frame and the second reference frame, the QP of the first reference frame and the second reference frame.

At S520, the controller determines whether to skip the entire operations of DMVR. In an example, the controller calculates a difference measure of the first reference block and the second reference block and compares the difference measure to a threshold to determine whether the distortion is too large. In another example, the controller calculates a difference measure of inverse L-shape region of the present block and the inverse L-shape region of the first reference block (or the second reference block) and compares the difference measure to a threshold to determine whether the distortion is too large. In another example, the controller calculates a difference measure of the inverse L-shape region of the first reference block and the inverse L-shape region of the second reference block and compares the difference measure to a threshold to determine whether the distortion is too large. In another example, the controller calculates a POC difference (or a QP difference) between the first reference frame and the second reference frame, and compares the POC difference (or the QP difference) to a threshold to determine whether the distortion is too large. When the distortion is too large, the process proceeds to S570; otherwise, the process proceeds to S530.

In another example, the controller calculates a first difference measure of the inverse L-shape region of the current block and the inverse L-shape region of the first reference block, calculates a second difference measure of the inverse L-shape region of the current block and the inverse L-shape region of the second reference block, and determines whether the two differences are similar. When the two differences are not similar (e.g., the difference of the first difference and the second difference is larger than a threshold), the process proceeds to S570; otherwise, the process proceeds to S530.

At S530, the controller provides control signals to start the DMVR, and a portion of the operations for DMVR is performed. In an example, the template block is calculated based on a combination (e.g., averaging at a pixel level, weighted averaging at the pixel level) of the first reference block and the second reference block. Further, based on the template block, the first motion vector is refined.

At S540, the controller determines whether to skip the remaining operations of DMVR. In an example, the controller calculates a difference measure of the first refined motion vector and the first motion vector, and compares the difference measure to a threshold to determine whether the refined motion vector is too similar to the original motion vector. In an example, the controller calculates a difference measure of the first relocated reference block that is pointed by the first refined motion vector and the template block, and compares the difference measure to a threshold to determine whether the relocated reference block is too similar to the template block. When the similarity is too high, the process proceeds to S560; otherwise, the process proceeds to S550.

At S550, the controller provides control signals to continue the DMVR and perform the remaining operations of the DMVR. For example, based on the template block, the second motion vector is refined.

At S560, the first motion vector prior to refinement is retrieved from a buffer device.

At S570, the inter-frame bi-prediction is performed based on motion vectors to generate the prediction results. In an example, when both the first refined motion vector and the second refined motion vector are available, the inter-frame bi-prediction is performed based on the first refined motion vector and the second refined motion vector. In an example, when the entire DMVR is skipped, the inter-frame bi-prediction is performed based on the first motion vector and the second motion vector. In an example, when the DMVR is partially performed, the inter-frame bi-prediction is performed based on the first motion vector and the second motion vector. Then the process proceeds to S599 and terminates.

It is noted that in some examples, the step S560 can be skipped. Thus, when the DMVR is partially performed, the inter-frame bi-prediction is performed based on the first refined motion vector and the second motion vector.

Figure 6:
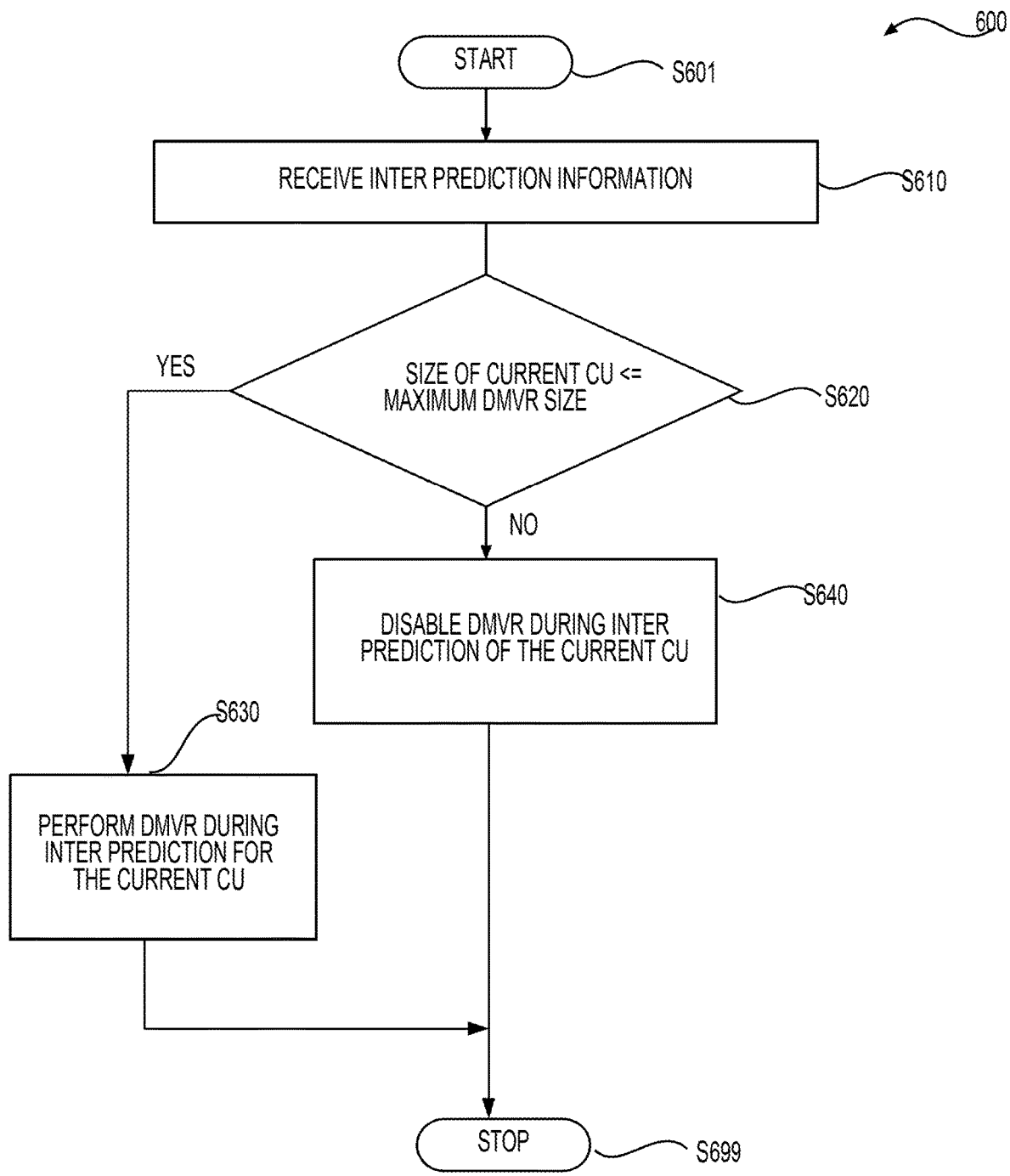
FIG. 6 shows a flow chart outlining a process 600 according to an embodiment of the disclosure.

FIG. 6 shows a flow chart outlining a process 600 according to an embodiment of the disclosure. In an example, the process 600 is performed by a controller, such as the DMVR early termination controller 140, the DMVR early termination controller 190, the DMVR early termination controller 340, the DMVR early termination controller 490, and the like. The process starts at S601 and proceeds to S610.

At S610, inter prediction information is received. In an example, the inter prediction information is indicative of merge mode bi-prediction for a current CU.

At S620, the controller determines whether the size of the current CU is larger than a maximum DMVR size. The maximum DMVR size is the maximum size (e.g., the maximum number of total samples, the maximum number of rows, or the maximum number of columns), for a process unit that is allowed for DMVR process. When the size of the current CU is smaller or equal to the maximum DMVR size, the process proceeds to S630; otherwise the process proceeds to S640.

At S630, the current CU is enabled for DMVR process. Thus, DMVR is performed during inter prediction of the current CU to generate prediction result. Then the process proceeds to S699 and terminates.

At S640, the current CU is disabled of DMVR process. Disable the DMVR process reduces computation complexity. Then, the inter prediction is performed on the current CU without performing DMVR. The process proceeds to S699 and terminates.

Figure 7:
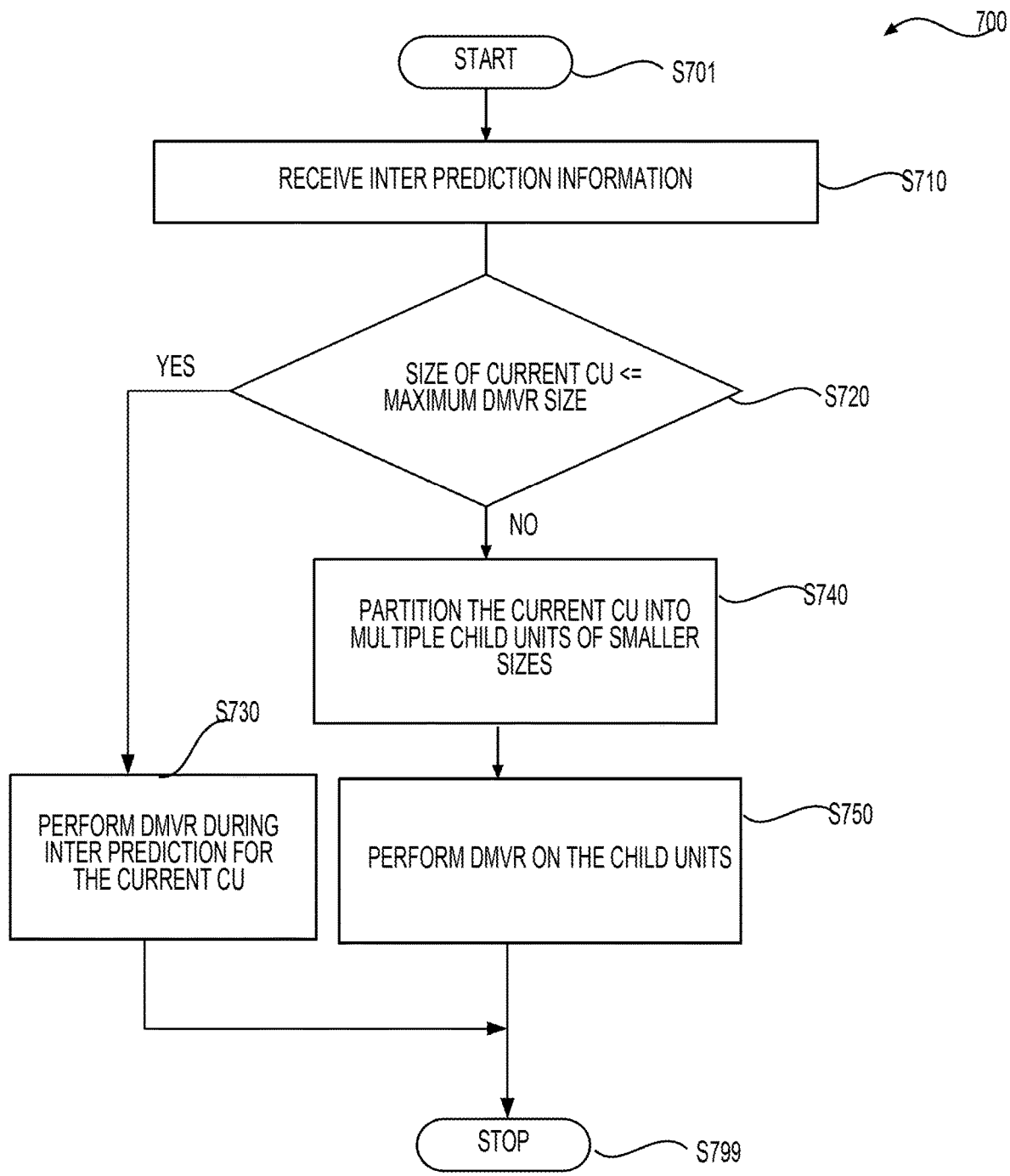
FIG. 7 shows a flow chart outlining a process 700 according to an embodiment of the disclosure.

FIG. 7 shows a flow chart outlining a process 700 according to an embodiment of the disclosure. In an example, the process 700 is performed by a controller, such as the DMVR early termination controller 140, the DMVR early termination controller 190, the DMVR early termination controller 340, the DMVR early termination controller 490, and the like. The process starts at S701 and proceeds to S710.

At S710, inter prediction information is received. In an example, the inter prediction information is indicative of merge mode bi-prediction for a current CU.

At S720, the controller determines whether the size of the current CU is larger than a maximum DMVR size. The maximum DMVR size is the maximum size (e.g., the maximum number of total samples, the maximum number of rows, or the maximum number of columns), for a process unit that is allowed for DMVR process. When the size of the current CU is smaller or equal to the maximum DMVR size, the process proceeds to S730; otherwise the process proceeds to S740.

At S730, the current CU is enabled for DMVR process. Thus, DMVR is performed during inter prediction of the current CU to generate a prediction result. Then the process proceeds to S799 and terminates.

At S740, the current CU is partitioned into multiple child units with smaller sizes that are equal or smaller than the maximum DMVR size.

At S750, the DMVR process is respectively performed on the child units during inter prediction. In an example, the child units inherit motion vectors from the current CU. Then, DMVR process is respectively applied on the child units during respective inter predictions. The process proceeds to S799 and terminates.

Figure 8:
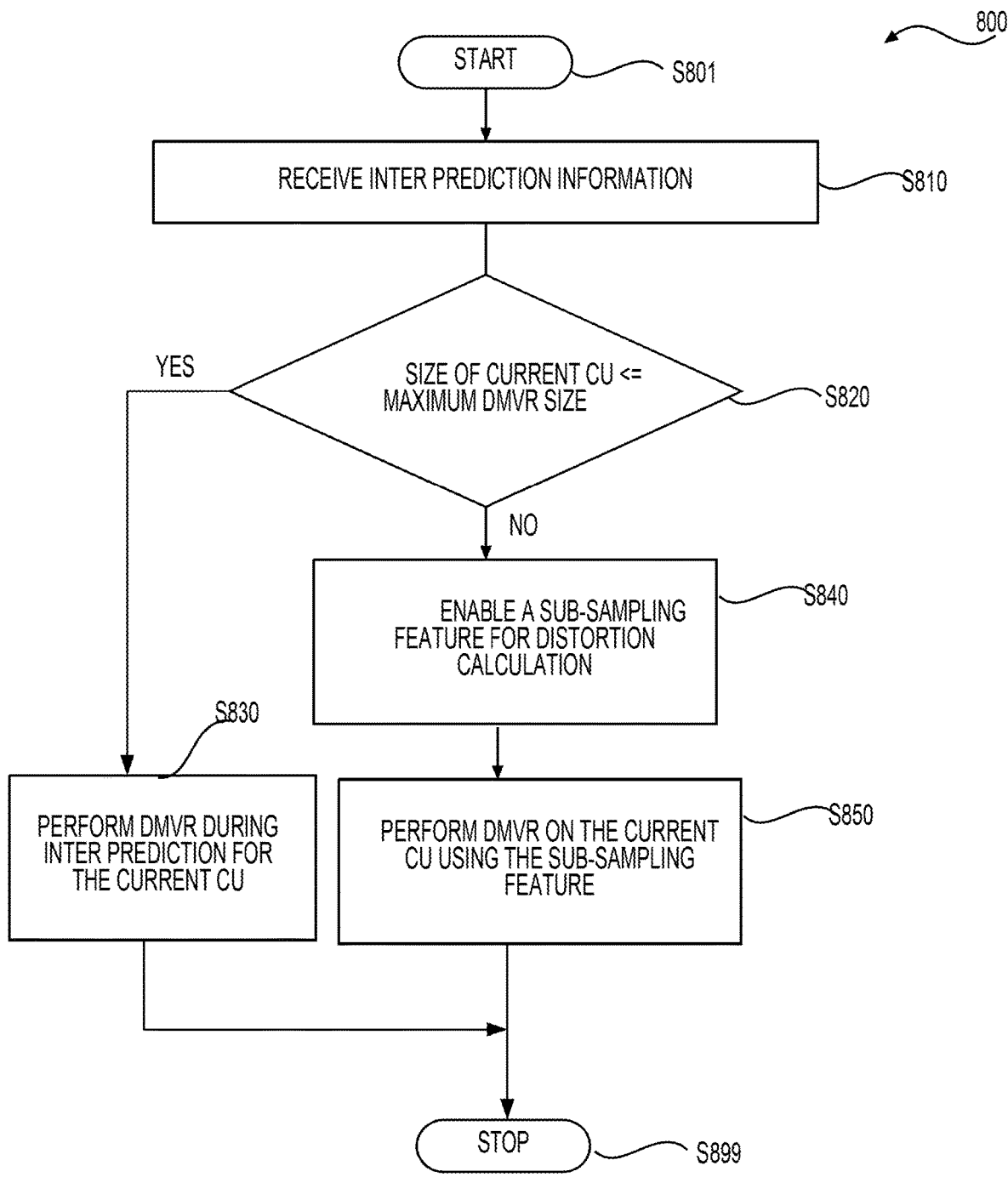
FIG. 8 shows a flow chart outlining a process 800 according to an embodiment of the disclosure

FIG. 8 shows a flow chart outlining a process 800 according to an embodiment of the disclosure. In an example, the process 800 is performed by a controller, such as the DMVR early termination controller 140, the DMVR early termination controller 190, the DMVR early termination controller 340, the DMVR early termination controller 490, and the like. The process starts at S801 and proceeds to S810.

At S810, inter prediction information is received. In an example, the inter prediction information is indicative of merge mode bi-prediction for a current CU.

At S820, the controller determines whether the size of the current CU is larger than a maximum DMVR size. The maximum DMVR size is the maximum size (e.g., the maximum number of total samples, the maximum number of rows, or the maximum number of columns), for a process unit that is allowed for DMVR process. When the size of the current CU is smaller or equal to the maximum DMVR size, the process proceeds to S830; otherwise the process proceeds to S840.

At S830, the current CU is enabled for DMVR process. Thus, DMVR is performed during inter prediction of the current CU to generate a prediction result. Then the process proceeds to S899 and terminates.

At S840, a sub-sampling feature is enabled for distortion calculation. The distortion calculation calculates, for example SAD or sum of squared errors (SSE), and the like for the best motion vector candidate selection. In an example, when the sub-sampling feature is enabled, the distortion calculation is based on odd rows or even rows in the current CU.

At S850, the DMVR process is performed on the current CU using the sub-sampling feature. For example, during the DMVR process, distortions are calculated based on a subset of the current CU, such as odd rows in the current CU, even rows in the current CU, and the like. The process proceeds to S899 and terminates.

It is noted that various components and modules in the FIG. 3 and FIG. 4 examples can be implemented using any suitable technique. In an example, a module is implemented using integrated circuit. In another example, a module is implemented as a processor executing software instructions.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for video coding, comprising:
receiving, by processing circuitry, input data associated with a curare €€t block that is a prediction block defined in a bitstream;
determining, by the processing circuitry, motion vectors of the current block;
determining, by the processing circuitry, whether a size of the current block is smaller than or equal to a threshold size for a-decoder-side motion vector refinement (DMVR);
in response to the size of the current block being determined to be smaller than or equal to the threshold size,
performing by the processing circuitry, a process of the DMVR for the current block based on the motion vectors of the current block; and
in response to the size of the current block being determined to be larger than the threshold size,
partitioning, by the processing circuitry, the current block into a plurality of sub-current blocks having a size equal to or smaller than the threshold size, the plurality of sub-current blocks inheriting the motion vectors of the current block, and
performing, by the processing circuitry, respective processes of the DMVR for the sub-current blocks based on the motion vectors of the current block.

2. The method of claim 1, wherein the respective processes of the DMVR for the sub-current blocks are independently performed.

3. The method of claim 1, wherein the threshold size is predefined or signaled at a sequence level, picture level, or slice level of the bitstream.

4. The method of claim 1, wherein the threshold size is dependent on video resolution or standard profile.

5. The method of claim 1, wherein the threshold size corresponds to a maximum number of total samples, a maximum number of rows, or a maximum number of columns.

6. An apparatus, comprising:
processing circuitry configured to:
receive input data associated with a current block that is a prediction block defined in a bitstream;
determine motion vectors of the current block;
determine whether a size of the current block is smaller than or equal to a threshold size for a-decoder-side motion vector refinement (DMVR);
in response to the size of the current block being determined to be smaller than or equal to the threshold size,
perform a process of the DMVR for the current block based on the motion vectors of the current block; and
in response to the size of the current block being determined to be larger than the threshold size:
partition the current block into a plurality of b-current blocks having a size equal to or smaller than the threshold size, the plurality of sub-current blocks inheriting the motion vectors of the current block; and
perform respective processes of the DMVR for the sub-current blocks based on the motion vectors of the current block.

7. The apparatus of claim 6, wherein the respective processes of the DMVR for the sub-current blocks are independently performed.

8. The apparatus of claim 6, wherein the threshold size is predefined or signaled at a sequence level, picture level, or slice level of the bitstream.

9. The apparatus of claim 6, wherein the threshold size is dependent on video resolution or standard profile.

10. The apparatus of claim 6, wherein the threshold size corresponds to a maximum number of total samples, a maximum number of rows, or a maximum number of columns.

* * * * *